(12) United States Patent
Wakaya et al.

(10) Patent No.: US 9,371,782 B2
(45) Date of Patent: Jun. 21, 2016

(54) CONTROL APPARATUS FOR INTERNAL COMBUSTION ENGINE

(75) Inventors: Ippei Wakaya, Toyota (JP); Yuji Miyanoo, Seto (JP); Yoshiyuki Shogenji, Toyota (JP); Hibiki Ueura, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 1029 days.

(21) Appl. No.: 13/483,335

(22) Filed: May 30, 2012

(65) Prior Publication Data
US 2012/0310511 A1    Dec. 6, 2012

(30) Foreign Application Priority Data
Jun. 1, 2011   (JP) .................................. 2011-123555

(51) Int. Cl.
F02D 41/04    (2006.01)
F02D 13/02    (2006.01)
F02D 9/02     (2006.01)

(52) U.S. Cl.
CPC .............. *F02D 13/0238* (2013.01); *F02D 9/02* (2013.01); *F02D 41/04* (2013.01); *Y02T 10/18* (2013.01)

(58) Field of Classification Search
CPC ........... F02D 13/02; F02D 9/02; F02D 41/04; F02D 41/08; F02D 41/16
USPC ............ 701/105, 111, 114; 123/90.15–90.17; 73/114.16, 114.41, 116.43
See application file for complete search history.

(56) References Cited

U.S. PATENT DOCUMENTS

| | | | | |
|---|---|---|---|---|
| 2003/0106542 A1* | 6/2003 | Aoyama | ................... | F01L 1/34 123/78 F |
| 2004/0035391 A1* | 2/2004 | Fuwa | .................... | F02D 11/107 123/90.15 |
| 2005/0229880 A1 | 10/2005 | Hashizume | | |
| 2006/0086338 A1* | 4/2006 | Kato | ......................... | F01L 1/34 123/90.15 |
| 2006/0162681 A1* | 7/2006 | Kawasaki | ........... | F02D 13/0207 123/90.16 |
| 2006/0225678 A1* | 10/2006 | Murata | ................. | F02B 29/083 123/90.15 |
| 2007/0039579 A1 | 2/2007 | Fuwa et al. | | |
| 2012/0310511 A1* | 12/2012 | Wakaya | .............. | F02D 13/0238 701/103 |
| 2015/0039209 A1* | 2/2015 | Yui | ..................... | F02D 41/0002 701/104 |

FOREIGN PATENT DOCUMENTS

| | | |
|---|---|---|
| JP | 05-001604 A | 1/1993 |
| JP | 2005-299594 A | 10/2005 |
| JP | 2007-051603 A | 3/2007 |

\* cited by examiner

*Primary Examiner* — Hieu T Vo
*Assistant Examiner* — Arnold Castro
(74) *Attorney, Agent, or Firm* — Sughrue Mion, PLLC

(57) ABSTRACT

When a working angle of an intake valve is increased in accordance with a deficiency in a working fluid pressure of a VVT mechanism, an electronic control unit corrects an opening degree of a throttle valve so as to increase an intake air amount, and thereby restraining the intake air amount from decreasing in accordance with the increase in the working angle with a valve timing of the intake valve retarded, and hence suppressing a fall in an engine rotational speed.

8 Claims, 8 Drawing Sheets

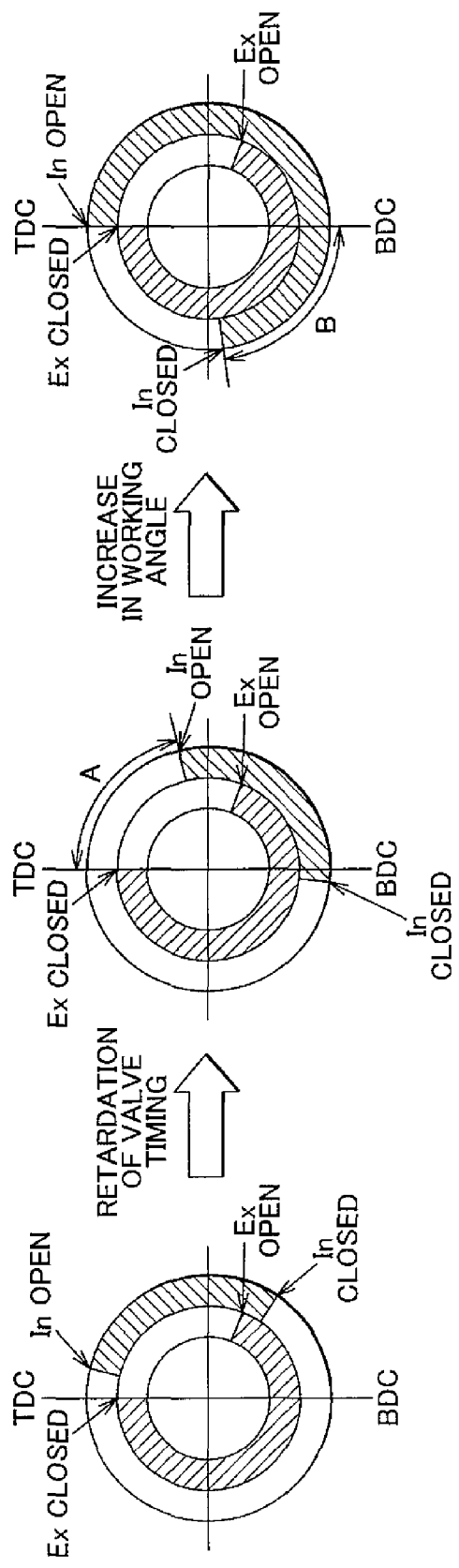

CONTROL APPARATUS FOR INTERNAL COMBUSTION ENGINE

INCORPORATION BY REFERENCE

The disclosure of Japanese Patent Application No. 2011-123555 filed on Jun. 1, 2011 including the specification, drawings and abstract is incorporated herein by reference in its entirety.

BACKGROUND OF THE INVENTION

1. Field of the Invention

The invention relates to a control apparatus for an internal combustion engine that is equipped with a variable working angle mechanism that changes the working angle of an intake valve.

2. Description of Related Art

As a mechanism that is mounted on an internal combustion engine of a vehicle or the like, there is known a variable valve characteristic mechanism that changes the valve characteristic of an intake valve. Examples of the variable valve characteristic mechanism include a variable working angle mechanism that changes the working angle of an intake valve, a variable valve timing mechanism that changes the valve timing of an intake valve, and the like. For example, in Japanese Patent Application Publication No. 05-001604 (JP-05-001604 A), there is described a mechanism that is equipped with two cams, namely, a large cam with a large working angle and a small cam with a small working angle, and changes over the cam for driving an intake valve between the large cam and the small cam to change the working angle of the intake valve.

In an internal combustion engine that is equipped with a variable working angle mechanism, the working angle is usually changed in accordance with the change in an engine operation state such as an engine rotational speed or an engine load. However, under certain circumstances, the working angle is changed independently of the change in the engine operation state.

An example in which the working angle is changed independently of the change in the engine operation state will be illustrated below. An exemplary case of an internal combustion engine that is equipped with two variable valve characteristic mechanisms, namely, a hydraulic variable valve timing mechanism that changes the valve timing of an intake valve through an oil pressure, and a variable working angle mechanism that changes the working angle of an intake valve through an oil pressure will now be described.

In this internal combustion engine, in some cases, a problem arises in a hydraulic system that supplies a working fluid to the hydraulic variable valve timing mechanism, and the working fluid pressure of the hydraulic variable valve timing mechanism becomes deficient. When the working fluid pressure becomes deficient, the valve timing cannot be held against a cam torque applied to a cam shaft, and the valve timing of the intake valve changes toward a retardation side (FIG. 8A→FIG. 8B). If it is assumed herein that the working angle of the intake valve at that time has been reduced, the valve-opening timing of the intake valve may be drastically retarded from an intake top dead center due to the retardation of the valve timing, as shown in FIG. 8B. It should be noted that "Ex OPEN" and "Ex CLOSED" in FIGS. 8A, 8B and 8C denote the timings for opening and closing an exhaust valve respectively, and that "In OPEN" and "In CLOSED" in FIGS. 8A, 8B and 8C denote the timings for opening and closing the intake valve respectively.

In this case, during a period A from the intake top dead center to the opening of the intake valve, a piston descends to increase the volume of a cylinder while the cylinder remains sealed. Then, when this period A lengthens, the pressure loss of the internal combustion engine becomes excessive to cause misfire. Thus, in such a case, as shown in FIG. 8C, the working angle of the intake valve is increased to advance the timing for opening the intake valve, so that the pressure loss of the intake valve is restrained from increasing to avoid misfire.

However, when the working angle is increased with the valve timing retarded, the timing for closing the intake valve becomes later than an intake bottom dead center. During a period B from the intake bottom dead center to the closing of the intake valve, the air in the cylinder is pushed back into an intake port as the piston ascends. Thus, when the working angle increases by a certain degree at this time, the amount of the air with which the cylinder is filled (a cylinder filling air amount) may become smaller than before the working angle increases. Besides, the working angle must be swiftly increased at this time to avoid misfire. Thus, when the working angle is increased by a certain degree at this time, the cylinder filling air amount, namely, the engine load may be abruptly reduced to cause an abrupt fall in the engine rotational speed.

It should be noted that when the working angle is changed by a certain degree, the engine load may increase to cause the engine rotational speed to rev up abruptly. For example, in the case where the working angle is increased within such a range that the valve-closing timing of the intake valve is earlier than the intake bottom dead center, the engine load increases due to the increase in the working angle, and the engine rotational speed revs up.

SUMMARY OF THE INVENTION (US)

The invention has been made in consideration of the foregoing circumstances, and attempts to solve a problem of providing a control apparatus for an internal combustion engine that can restrain the engine rotational speed from abruptly changing as a result of a change in the working angle of an intake valve.

In order to solve the above-stated problem, a control apparatus for an internal combustion engine comprise a variable working angle mechanism that changes a working angle of an intake valve, and a controller that, when the working angle is changed, corrects an opening degree of a valve for adjusting an intake air amount to change an amount of air to be filled in the cylinder (a cylinder filling air amount) in a direction reverse to a change of the intake air amount resulting from the change in the working angle.

In the aforementioned configuration, even when the intake air amount changes in accordance with the change in the working angle, the opening degree of the valve for adjusting the intake air amount such as a throttle valve or an idle speed control (ISC) valve is corrected toward so as to change the cylinder filling air amount in the direction reverse to the change in the intake air amount. For example, when the cylinder filling air amount decreases in accordance with the change in the working angle, the opening degree of the valve for adjusting the intake air amount is corrected to increase the cylinder filling air amount, namely, toward such a side that the intake air amount increases. Thus, the engine load can be restrained from changing as a result of the change in the working angle, and the engine rotational speed can be restrained from abruptly changing as a result of the change in the working angle.

Further, in order to solve the above-stated problem, a control apparatus for an internal combustion engine comprises a variable working angle mechanism that changes a working angle of an intake valve, and a controller that, when the working angle is increased, corrects an opening degree of a valve for adjusting an intake air amount so as to increase the intake air amount.

When the valve-closing timing of the intake valve after the increase in the working angle is later than the intake bottom dead center, the cylinder filling air amount may decrease in accordance with the increase in the working angle, and cause a fall in the engine rotational speed. In this respect, according to the foregoing configuration, even when the cylinder filling air amount decreases in accordance with the increase in the working angle, the opening degree of the valve for adjusting the intake air amount is corrected toward such a side that the intake air amount increases. Thus, the engine load can be restrained from decreasing as a result of the increase in the working angle, and the engine rotational speed can be restrained from abruptly changing as a result of the change in the working angle.

A decrease in the intake air amount resulting from the increase in the working angle occurs when the valve-closing timing of the intake valve after the increase in the working angle is later than the intake bottom dead center. Thus, the opening degree of the valve for adjusting the intake air amount may be corrected to restrain the engine rotational speed from falling as a result of the increase in the working angle, when the valve-closing timing of the intake valve after the increase in the working angle is later than the intake bottom dead center.

On the other hand, in an internal combustion engine that is equipped with a variable valve timing mechanism that changes the valve timing of an intake valve, the amount or timing of the change in the intake air amount resulting from the change in the working angle changes depending on the valve timing of the intake valve. Thus, in such an internal combustion engine, the amount and timing of the correction of the opening degree of the valve for adjusting the intake air amount, which is made to restrain the intake air amount from changing as a result of the change in the working angle, may be changed in accordance with the valve timing of the intake valve at the time of the change in the working angle.

Further, in an internal combustion engine that is equipped with a hydraulic variable valve timing mechanism that hydraulically operates to change the valve timing of an intake valve, when the working fluid pressure of the hydraulic variable valve timing mechanism becomes deficient, the working angle may be increased. Besides, when the working angle is increased by a certain degree at this time, the intake air amount may decrease to cause a fall in the engine rotational speed. Accordingly, in such an internal combustion engine, the opening degree of the aforementioned valve may be corrected when the working angle is increased in accordance with the deficiency in the working fluid pressure of the hydraulic variable valve timing mechanism.

By the way, when the working angle is changed gentler than at a certain level, the change in the intake air amount resulting from the change in the working angle becomes gentle, and hence, the change in the engine rotational speed resulting therefrom also becomes gentle. In consequence, an abrupt change in the engine rotational speed resulting from the change in the working angle occurs only when the working angle is rapidly changed. Thus, even if the opening degree of the valve for adjusting the intake air amount is corrected in accordance with the change in the working angle only when the speed of change in the working angle is higher than a prescribed speed, the engine rotational speed can be restrained from abruptly changing as a result of the change in the working angle.

It should be noted that, the amount of correction of the opening degree of the valve for adjusting the intake air amount is gradually reduced with the passage of time after an abrupt change in the engine rotational speed resulting from the change in the working angle is averted through the correction of the opening degree of the valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 8A, 8B, and 8C are a view showing timings for opening and closing the intake valve and an exhaust valve, in particular, FIG. 8A shows timings before retardation of a valve timing, FIG. 8B shows timings after retardation of the valve timing, and FIG. 8C shows timings after an increase in the working angle respectively.

DETAILED DESCRIPTION OF EMBODIMENTS (First Embodiment) One embodiment as a concrete form of a control apparatus for an internal combustion engine according to the invention will be described hereinafter in detail with reference to FIGS. 1 to 6. It should be noted that the control apparatus of this embodiment of the invention is applied to an internal combustion engine that is equipped with two variable valve characteristic mechanisms, namely, a variable working angle mechanism that changes the working angle of an intake valve continuously, and a hydraulic variable valve timing mechanism that hydraulically operates to change the valve timing of the intake valve continuously.

Figure 1:
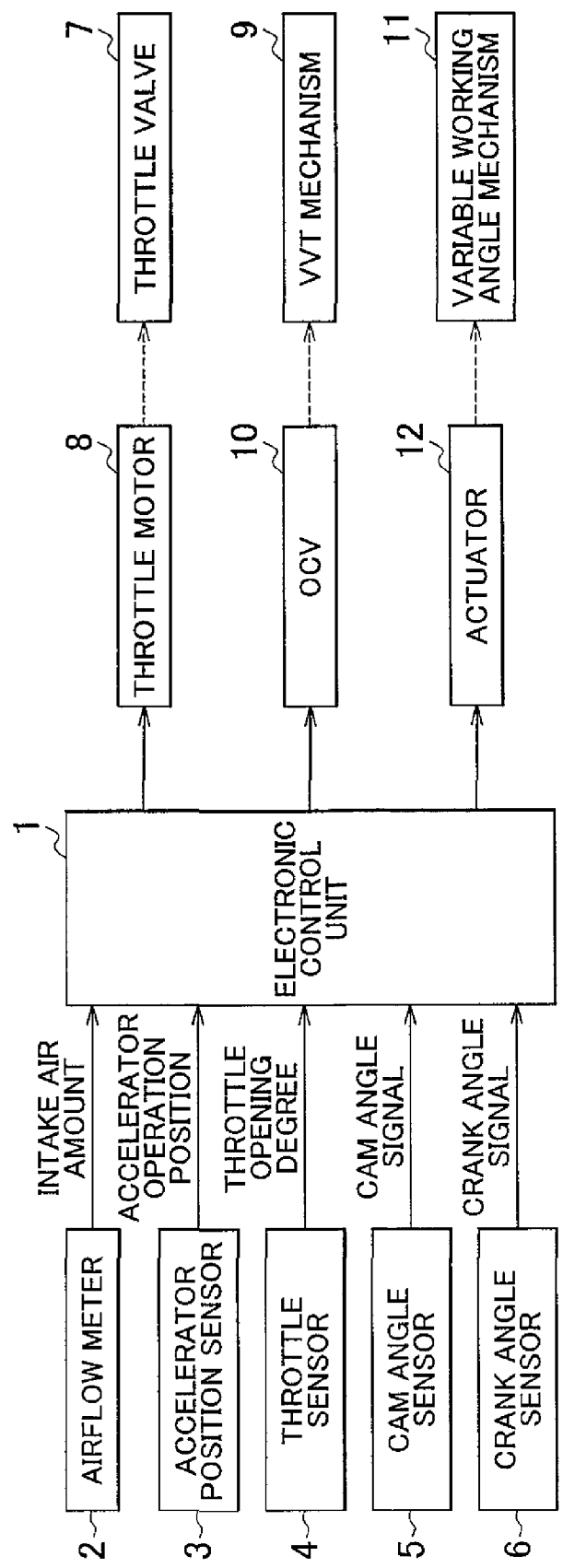
FIG. 1 is a schematic view schematically showing an overall configuration of a control apparatus for an internal combustion engine according to the first embodiment of the invention.
Figure 2:
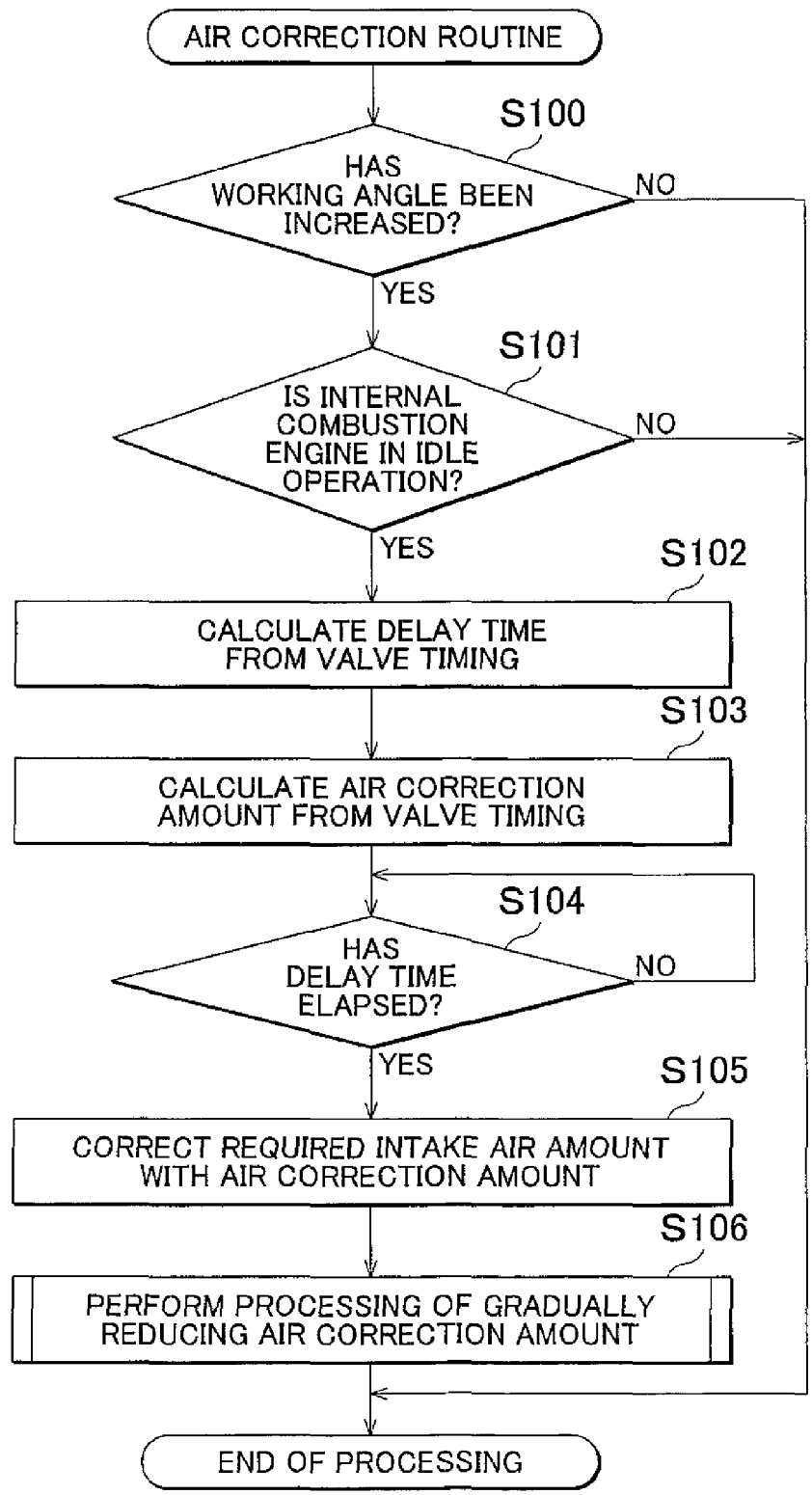
FIG. 2 is a flowchart showing a processing procedure of an air correction routine adopted in the first embodiment of the invention.

As shown in FIG. 1, the control apparatus for the internal combustion engine according to this embodiment of the invention is mainly constituted by an electronic control unit 1.

The electronic control unit 1 is equipped with a central processing unit (a CPU) that performs various kinds of calculation processing related to engine control, a read-only memory (a ROM) in which programs and data for engine control are stored, and a random access memory (a RAM) that temporarily stores a calculation result of the CPU, detection results of sensors and the like.

Detection signals of, for example, various sensors (A) to (E) mentioned below, which are provided in respective regions of a vehicle, are input to the electronic control unit 1. The sensor (A) is an airflow meter 2 that detects an intake air amount. The sensor (B) is an accelerator position sensor 3 that detects an accelerator operation position. The sensor (C) is a throttle sensor 4 that detects a throttle opening degree. The sensor (D) is a cam angle sensor 5 that outputs a signal (a cam angle signal) corresponding to a rotational angle (a cam angle) of a cam shaft. The sensor (E) is a crank angle sensor 6 that outputs a signal (a crank angle signal) corresponding to a rotational angle (a crank angle) of a crankshaft.

Further, for example, various actuators (F) to (H) mentioned below, which change the operation state of the internal combustion engine, are connected to the electronic control unit 1. Besides, the electronic control unit 1 drives and controls the actuators to perform engine control, such as adjustment of the intake air amount and change of the valve timing and working angle of the intake valve. The actuator (F) is a throttle motor 8 that changes the opening degree of a throttle valve 7 as a valve for adjusting the intake air amount, namely, a throttle opening degree. The actuator (G) is an oil control valve (an OCV) 10 that changes the working fluid pressure of a variable valve timing mechanism (a VVT mechanism) 9 that changes the valve timing of the intake valve. The actuator (H) is an actuator 12 that drives a variable working angle mechanism 11 that changes the working angle of the intake valve.

During engine operation, the electronic control unit 1 monitors whether or not the working fluid pressure of the VVT mechanism 9 is deficient. This deficiency in the working fluid pressure can be confirmed from, for example, a decrease in the response speed of the VVT mechanism 9.

As described above, when the working fluid pressure of the VVT mechanism 9 becomes deficient, the valve timing cannot be held against a cam torque applied to the cam shaft, and the valve timing of the intake valve changes toward a retardation side. Besides, if it is assumed that the working angle of the intake valve at that time has been reduced, the valve-opening timing of the intake valve becomes much later than an intake top dead center due to the retardation of the valve timing. When the valve-opening timing of the intake valve thus becomes late, a piston descends to increase the volume of a cylinder while the cylinder remains sealed during a period from the intake top dead center to the opening of the intake valve. As a result, the pressure loss of the internal combustion engine increases to cause misfire.

Thus, in this embodiment of the invention, when a deficiency in the working fluid pressure of the VVT mechanism 9 is confirmed, the electronic control unit 1 increases the working angle of the intake valve to advance the valve-opening timing of the intake valve, thereby restraining the pressure loss of the intake valve from increasing and hence avoiding misfire. It should be noted that the working angle of the intake valve is rapidly increased at this time to avoid misfire.

Further, as described above, when the working angle of the intake valve is increased with the valve timing thereof retarded, the valve-closing timing of the intake valve becomes much later than an intake bottom dead center. During a period from the intake bottom dead center to the closing of the intake valve, as the piston ascends, the air in the cylinder is pushed back into an intake port. Therefore, when the working angle is increased by a certain degree at this time, the amount of air to be filled in the cylinder (the cylinder filling air amount) may become smaller than before the working angle is increased. Besides, the working angle must be swiftly revved up at this time to avoid misfire. Thus, when the working angle is increased by a certain degree at this time, the cylinder filling air amount may be abruptly reduced, and thereby causing an abrupt fall in the engine rotational speed.

Thus, in this embodiment of the invention, in order to prevent the engine rotational speed from abruptly falling as a result of such an increase in the working angle, the electronic control unit 1 performs the following control. This control is performed through a processing of an air correction routine shown in FIG. 2. The processing of this routine is performed by the electronic control unit 1 every time a command to change the working angle of the intake valve is issued.

Then, when this routine is started, it is confirmed first in step S100 whether or not the working angle of the intake valve has been increased from a minimum working angle as a minimum value in a variable working angle range to a maximum working angle as a maximum value in the variable working angle range. When the working angle has not been thus increased in this case (S100: NO), the current processing of this routine is immediately terminated.

On the other hand, when the working angle is increased as described above (S100: YES), it is confirmed in the following step S101 whether or not the internal combustion engine is currently in idle operation. It should be noted herein that when the internal combustion engine is not in idle operation, the current processing of this routine is immediately terminated. Otherwise, the processing is shifted to step S102. Incidentally, the working angle of the intake valve is increased from the minimum working angle to the maximum working angle during idle operation, for example, when the deficiency in the working fluid pressure of the VVT mechanism 9.

Figure 3:
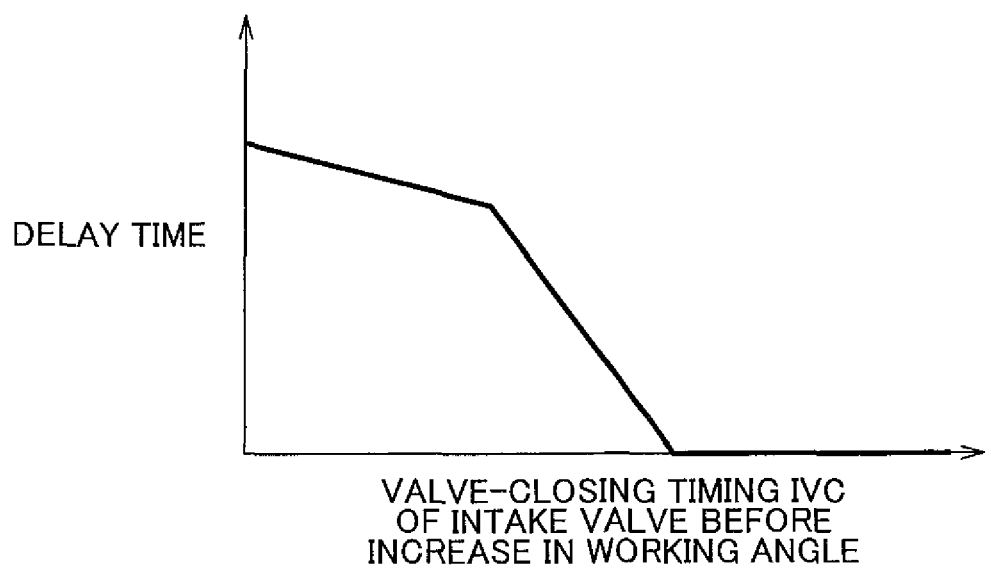
FIG. 3 is a graph showing a relationship between a valve-closing timing of an intake valve and a delay time of the intake valve before an increase in a working angle in an example of a calculation map for calculating the delay time.

When the processing shifts to step S102, a delay time is calculated on the basis of a valve timing of the intake valve at that time in step S102. In this embodiment of the invention, the delay time as mentioned herein is calculated from a valve-closing timing IVC of the intake valve before the increase in the working angle, on the basis of a calculation map shown in FIG. 3. It should be noted that the valve-closing timing IVC indicates the magnitude of a crank angle from the intake bottom dead center to the closing of the intake valve. As shown in FIG. 3, when the valve-closing timing IVC of the intake valve before the increase in the working angle is later than the intake bottom dead center, the value of the delay time is set to "0". Further, when the valve-closing timing IVC is earlier than the intake bottom dead center, the value of the delay time is set to a value that increases as the valve-closing timing IVC is advanced.

Figure 4:
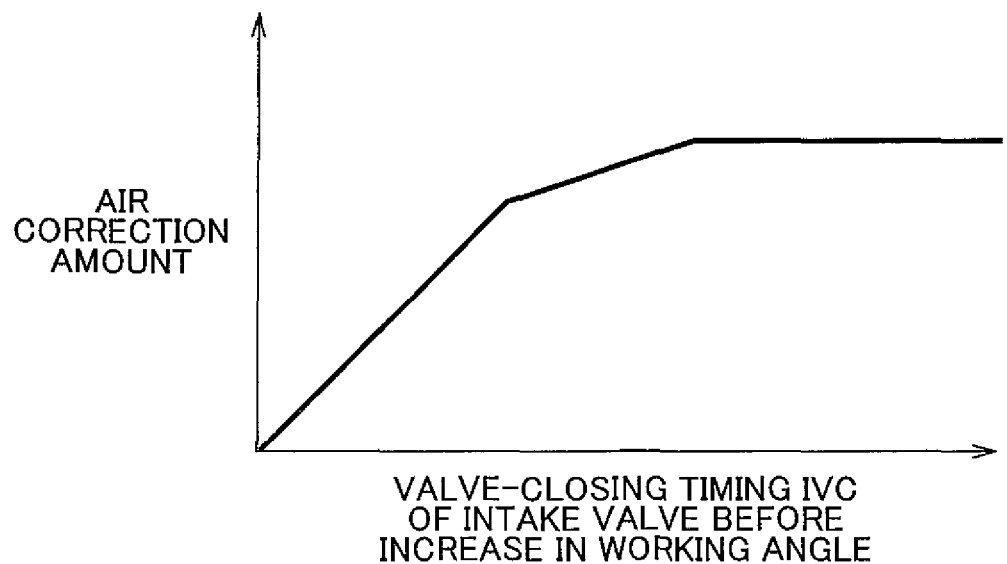
FIG. 4 is a graph showing a relationship between the valve-closing timing of the intake valve and an air correction amount of the intake valve before an increase in a working angle in an example of a calculation map for calculating the air correction amount.

Then in step S103, an air correction amount is calculated on the basis of a valve timing of the intake valve at that time. In this embodiment of the invention, the air correction amount as mentioned herein is calculated from the valve-closing timing IVC of the intake valve before the increase in the working angle, on the basis of a calculation map shown in FIG. 4. As shown in FIG. 4, an air correction amount qvtf is set to a value that increases as the valve-closing timing of the intake valve before the increase in the working angle is retarded. It should be noted that when the valve timing before the increase in the working angle is advanced and the valve-closing timing of the intake valve does not become later than the intake bottom dead center even by increasing the working angle, the value of the air correction amount qvtf is set to "0".

When the delay time and the air correction amount qvtf are thus calculated, the lapse of the aforementioned calculated delay time from the issuance of a command to increase the working angle is awaited in the following step S104, and then, a required intake air amount qcal is corrected toward an increase side in accordance with the aforementioned calculated air correction amount qvtf in step S105. The required intake air amount qcal is used to calculate a throttle opening degree. The throttle opening degree is increased as the value of the required intake air amount qcal increases. Accordingly, when the required intake air amount qcal is corrected by a certain value at this time, the throttle opening degree is corrected toward such a side that the cylinder filling air amount changes in a direction reverse to a change of the cylinder filling air amount resulting from the change in the working angle, namely, toward such a side that the intake air amount increases.

After that, in step S106, a gradual reduction processing is performed to gradually reduce the value of the air correction amount qvtf with the passage of time until the air correction amount qvtf becomes equal to "0". Then, when the air correction amount qvtf is gradually reduced to "0", the current processing of this routine is terminated.

Next, the operation of this embodiment of the invention as described above will be described with reference to FIGS. 5 and 6. It should be noted in each of FIGS. 5 and 6 that a control mode in the case where the processing of the aforementioned air correction routine is performed is indicated by a solid line, and that a control mode in the case where the processing of the aforementioned air correction routine is not performed is indicated by a broken line.

Figure 5:
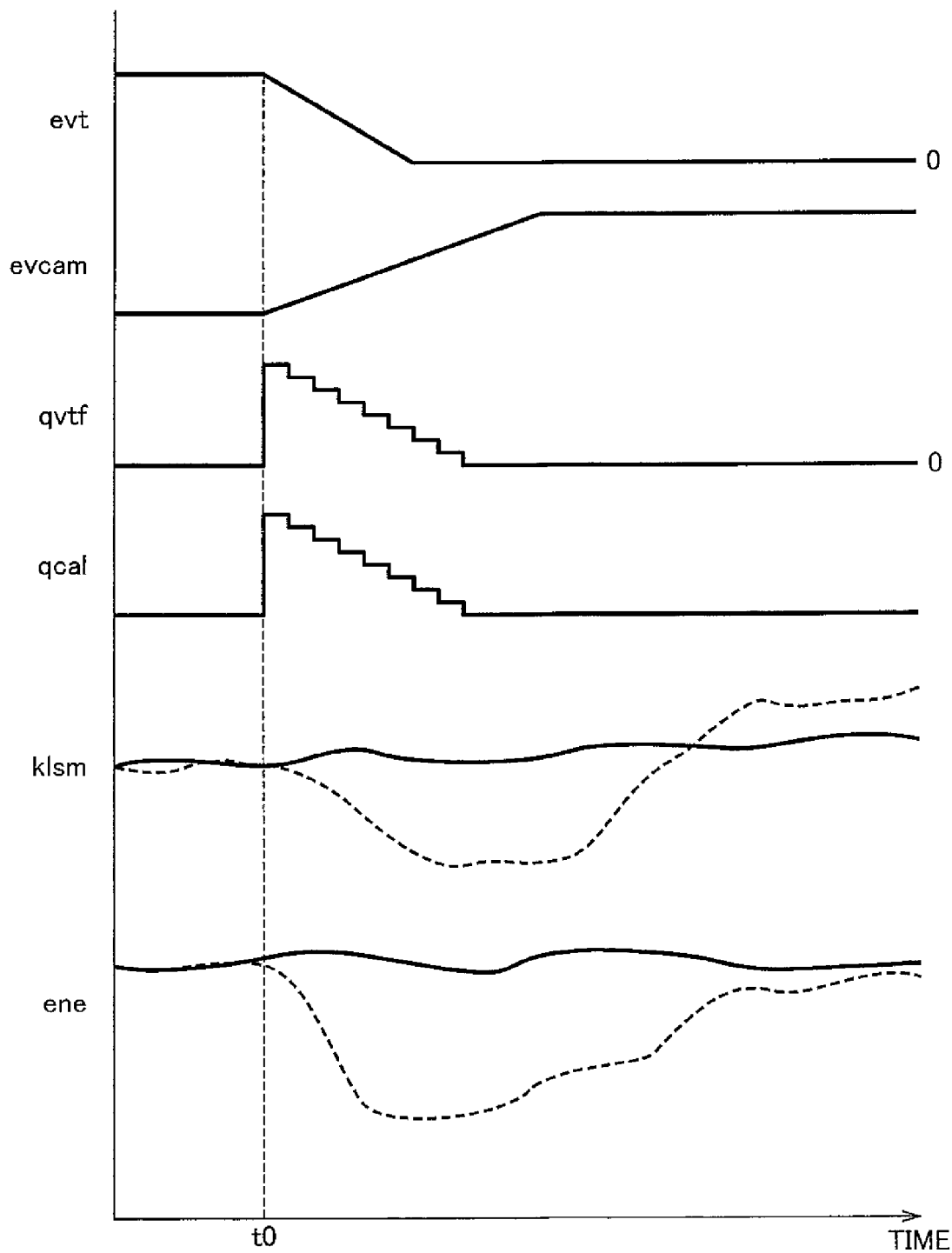
FIG. 5 is a time chart showing a control mode at a time when the valve-closing timing of the intake valve before the increase in the working angle is later than an intake bottom dead center.

FIG. 5 shows a control mode at the time when the valve-closing timing IVC of the intake valve before the increase in the working angle is later than the intake bottom dead center. When the working fluid pressure of the VVT mechanism 9 becomes deficient at a time t0 in FIG. 5, a valve timing evt of the intake valve shifts toward a retardation side afterward. When the valve timing is thus retarded, a working angle evcam of the intake valve is increased to avoid the occurrence of misfire due to an increase in the pressure loss resulting from the retardation.

It should be noted herein that in the case where the processing of the air correction routine is not performed, the required intake air amount qcal is held unchanged even when the working angle evcam of the intake valve is increased in this case. In this case, therefore, the throttle opening degree is not changed either. As the working angle evcam is increased, the cylinder filling air amount, namely, an engine load klsm decreases to cause a fall in an engine rotational speed ene.

On the other hand, in this embodiment of the invention, the required intake air amount qcal is corrected toward the increase side, and hence the throttle opening degree is corrected toward the increase side, in accordance with the increase in the working angle evcam of the intake valve in this case. It should be noted that the delay time in this case is set to "0", and that the correction of the required intake air amount qcal, namely, the correction of the throttle opening degree at this time is started simultaneously with the increase in the working angle evcam. Thus, in this embodiment of the invention, even when the working angle evcam is increased, the engine load klsm does not decrease, and the engine rotational speed ene does not fall either.

Figure 6:
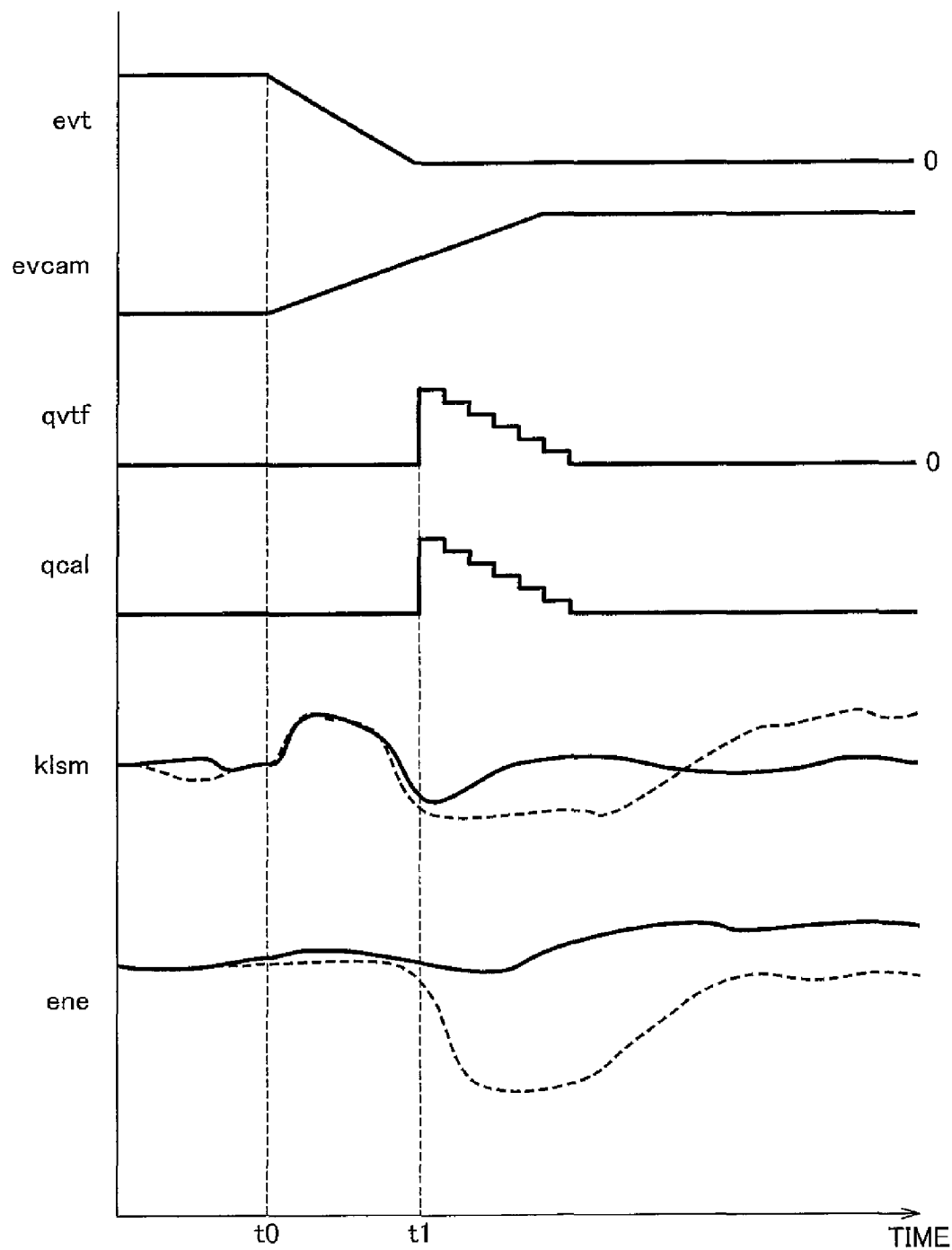
FIG. 6 is a time chart showing a control mode at a time when the valve-closing timing of the intake valve before the increase in the working angle is earlier than the intake bottom dead center.

FIG. 6 shows a control mode at the time when the valve-closing timing IVC of the intake valve before the increase in the working angle is earlier than the intake bottom dead center. In FIG. 6 as well, when the working fluid pressure of the VVT mechanism 9 becomes deficient at the time t0, the working angle evcam of the intake valve is increased to avoid the occurrence of misfire due to an increase in the pressure loss resulting from the subsequent shift of the valve timing evt of the intake valve toward the retardation side.

In this case, until the valve-closing timing IVC of the intake valve reaches the intake bottom dead center, the valve-open period of the intake valve during descent of the piston is long. Therefore, the engine load klsm temporarily increases. Then, in the case where the processing of the air correction routine is not performed, the engine load klsm decreases in accordance with the increase in the working angle evcam after the valve-closing timing IVC of the intake valve reaches the intake bottom dead center, and causes a fall in the engine rotational speed ene.

In contrast, in this embodiment of the invention, from a time t1 when the delay time calculated in accordance with the valve timing before the increase in the working angle has elapsed from the issuance of a command to increase the working angle, the required intake air amount qcal is corrected toward the increase side, and hence the throttle opening degree is corrected toward the increase side. In this embodiment of the invention, therefore, even when the working angle evcam is increased, the engine load klsm does not decrease, and the engine rotational speed ene does not fall either.

It should be noted that the time from the start of the increase in the working angle evcam to the occurrence of a decrease in the intake air amount resulting therefrom lengthens as the valve-closing timing IVC of the intake valve before the increase in the working angle is advanced. Thus, in this embodiment of the invention, the delay time is set to a time that lengthens as the valve-closing timing IVC of the intake valve before the increase in the working angle is advanced, so that the throttle opening degree is corrected at the timing when the intake air amount decreases as a result of the increase in the working angle evcam.

The control apparatus for the internal combustion engine according to this embodiment of the invention described above can achieve the following effects. (1) In this embodiment of the invention, when the working angle changes, the throttle opening degree is corrected so as to as change the cylinder filling air amount, namely, toward such a side that the cylinder filling air amount changes, in the direction reverse to a change resulting from the change in the working angle. More specifically, when the working angle is increased, the opening degree of the valve for adjusting the intake air amount is corrected toward such a side that the cylinder filling air amount increases. Thus; the engine load is restrained from changing (decreasing) as a result of the change (the increase) in the working angle, and the engine rotational speed can be restrained from abruptly changing (falling) as a result of the change in the working angle.

(2) In this embodiment of the invention, intake air correction is made when the valve-closing timing of the intake valve after the increase in the working angle is later than the intake bottom dead center. Thus, when it is probable that the intake air amount will decrease as a result of the increase in the working angle, the intake air correction can be made to restrain the intake air amount from decreasing.

(3) In this embodiment of the invention, the air correction amount qvtf and the delay time are changed in accordance with the valve timing of the intake valve. That is, in this embodiment of the invention, the amount and timing of correction of the throttle opening degree corresponding to the increase in the working angle are changed in accordance with the valve timing of the intake valve at the time of the change in the working angle. Thus, the throttle opening degree can be adequately corrected to restrain the intake air amount from decreasing as a result of the increase in the working angle.

(4) In this embodiment of the invention, the throttle opening degree is corrected when the working angle is increased in accordance with the deficiency in the working fluid pressure of the VVT mechanism 9 in which the working angle is increased at high speed. Thus, the engine rotational speed can be adequately restrained from abruptly falling due to an abrupt decrease in the intake air amount under such circumstances.

(5) In this embodiment of the invention, after an abrupt change in the engine rotational speed resulting from the change in the working angle is avoided by correcting the throttle opening degree, the amount of correction of the throttle opening degree is gradually reduced with the passage of time. Thus, after the abrupt change in the engine rotational speed is avoided, a smooth transition to normal control can be made.

Figure 7:
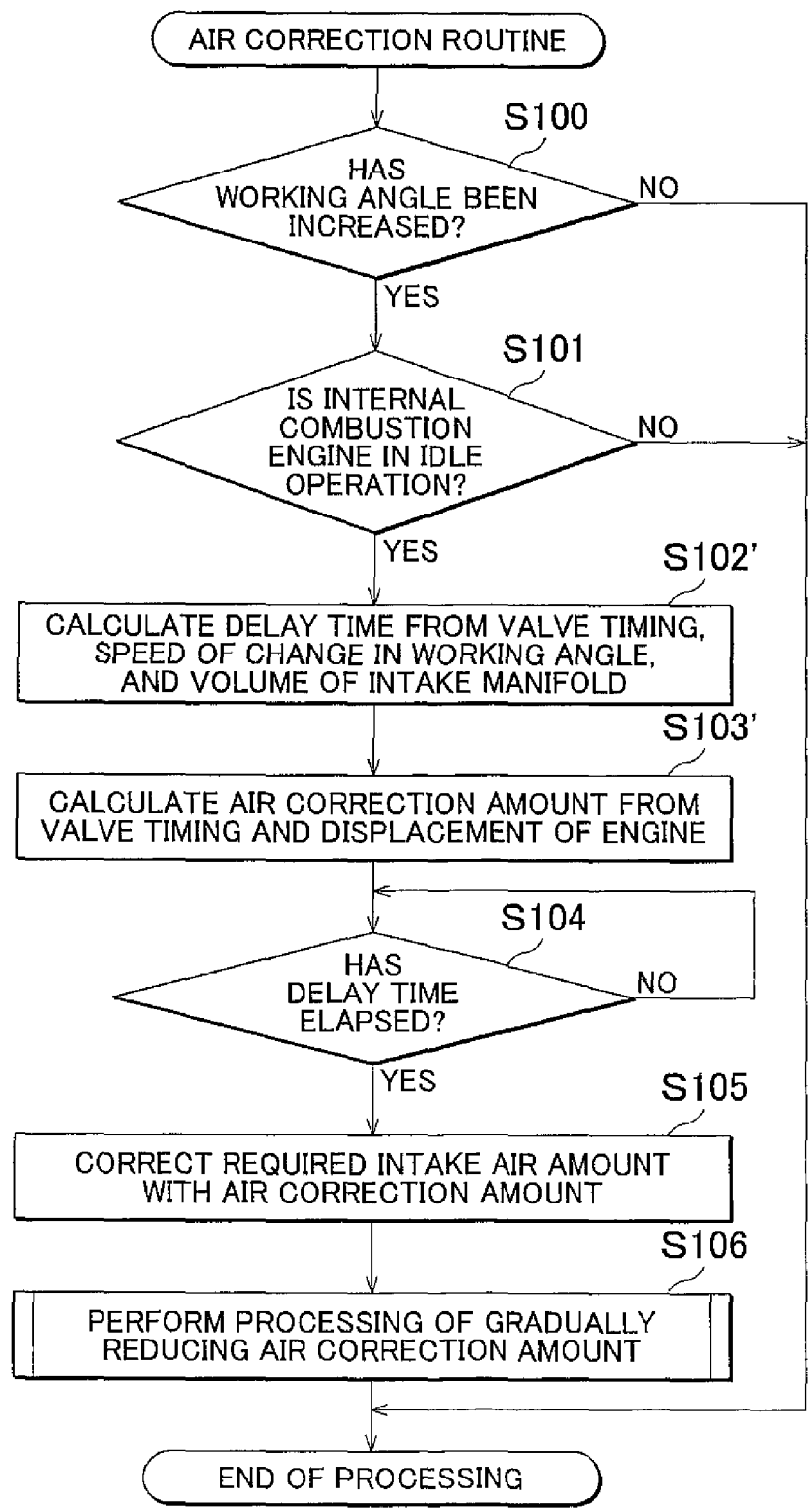
FIG. 7 is a flowchart showing a processing procedure of an air correction routine adopted in the second embodiment of the invention.

(Second Embodiment) Next, the second embodiment as a concrete form of a control apparatus for an internal combustion engine according to the invention will be described in detail with reference to FIG. 7 as well. It should be noted that those components of this embodiment of the invention which are the same as in the foregoing embodiment of the invention are denoted by the same reference symbols respectively, and that the detailed description thereof will be omitted.

In this embodiment of the invention, the control logic of the air correction routine has versatility so as to be applicable to different types of internal combustion engines as well. As shown in FIG. 7, an air correction routine adopted in this embodiment of the invention as described above is obtained by altering the processes of step S102 and step S103 in the routine according to the first embodiment of the invention shown in FIG. 2, namely, the processes related to the calculation of the delay time and the air correction amount qvtf.

In the air correction routine according to this embodiment of the invention as described above, a delay time is calculated in step S102' on the basis of a valve timing of the intake valve, a speed of change in the working angle, and a volume (an intake manifold volume) of an intake manifold of an internal combustion engine. More specifically, the delay time is set to a time that lengthens as the speed of change in the working angle decreases or as the volume of the intake manifold of the internal combustion engine increases.

Further, in the air correction routine according to this embodiment of the invention, the air correction amount qvtf is calculated in step S103' from the valve timing of the intake valve at that time and the displacement of an internal combustion engine. More specifically, the air correction amount qvtf is set to a value that increases as the displacement of the internal combustion engine increases.

This embodiment of the invention as described above can achieve the following effects in addition to the aforementioned effects (1) to (5). (6) The time from the increase in the working angle to the occurrence of a decrease in the intake air amount resulting therefrom lengthens as the volume of the intake manifold of the internal combustion engine increases. Thus, according to this embodiment of the invention, the delay time can be adequately set such that the intake air amount can be restrained from abruptly changing as a result of the change in the working angle even in an internal combustion engine having an intake manifold with a different volume.

(7) The time from the increase in the working angle to the occurrence of a decrease in the intake air amount resulting therefrom lengthens as the speed of change in the working angle decreases. Thus, according to this embodiment of the invention, the delay time can be adequately set such that the intake air amount can be restrained from abruptly changing as a result of the change in the working angle even in the case where the speed of change in the working angle is different.

(8) The amount of decrease in the intake air amount resulting from the increase in the working angle increases as the displacement of the internal combustion engine increases. Thus, in this embodiment of the invention, the air correction amount qvtf can be adequately set such that the intake air amount can be restrained from abruptly changing as a result of the change in the working angle even in an internal combustion engine with a different displacement.

It should be noted that each of the foregoing embodiments of the invention can also be implemented after being modified as follows. In each of the foregoing embodiments of the invention, the air correction amount qvtf is gradually reduced with the passage of time. However, the air correction amount qvtf may be held unchanged until the working angle returns to its original value or the engine operation state changes.

In each of the foregoing embodiments of the invention, when the working angle is increased in accordance with the deficiency in the working fluid pressure of the VVT mechanism 9, the correction of the throttle opening degree (hereinafter referred to as the air correction of the throttle opening degree) is made to restrain the engine rotational speed from abruptly changing as a result of the increase in the working angle. Under other circumstances as well, when the valve-closing timing of the intake valve after the increase in the working angle is later than the intake bottom dead center, the air correction of the throttle opening degree may be made. It should be noted that an abrupt fall in the engine rotational speed corresponding to the increase in the working angle occurs only when the speed of change in the working angle is high. Thus, even if the air correction of the throttle opening degree is made only when the speed of change in the working angle is higher than a prescribed speed, the engine rotational speed can be restrained from abruptly falling in accordance with the increase in the working angle.

In each of the foregoing embodiments of the invention, when the working angle is increased during idle operation, the air correction of the throttle opening degree is made. However, if an abrupt change in the engine rotational speed corresponding to the increase in the working angle causes a problem except during idle operation as well, the air correction of the throttle opening degree may be made in the other operation states of the internal combustion engine than idle operation as well.

In each of the foregoing embodiments of the invention, the air correction of the throttle opening degree is made toward such a side that the intake air amount increases at the time of the increase in the working angle. However, when the working angle is increased within such a range that the valve-closing timing of the intake valve precedes the intake bottom dead center, the cylinder filling air amount increases due to the increase in the working angle, and causes the engine rotational speed to rev up. In consequence, in the case where the air correction of the throttle opening degree is made when the valve-closing timing of the intake valve after the increase in the working angle is earlier than the intake bottom dead center, the air correction of the throttle opening degree is made toward such a side that the intake air amount increases in accordance with the increase in the working angle. Thus, the engine rotational speed can be restrained from abruptly changing in accordance with the increase in the working angle.

In each of the foregoing embodiments of the invention, the air correction of the throttle opening degree is made when the working angle is increased. However, the intake air amount may abruptly change in accordance with a reduction in the working angle as well, and thereby causing an abrupt change in the engine rotational speed. Therefore, in the case where an abrupt change in the engine rotational speed corresponding to such a reduction in the working angle causes a problem, the air correction of the throttle opening degree may be made at the time of the reduction in the working angle.

In each of the foregoing embodiments of the invention, the air correction amount and the delay timing are changed in accordance with the valve timing of the intake valve. However, in the case where the valve timing of the intake valve at the time of an change in the working angle, which causes an abrupt change in the engine rotational speed, is fixed or the internal combustion engine is not equipped with a variable valve timing mechanism, the change in the air correction amount or the delay timing corresponding to the valve timing may be omitted.

In each of the foregoing embodiments of the invention, the air correction is made for the opening degree of the throttle valve 7. However, even when a similar air correction is made for the opening degree of a valve other than the throttle valve that adjusts the intake air amount, such as an ISC valve or the like, the engine rotational speed can be restrained from abruptly changing in accordance with the change in the working angle of the intake valve.

In each of the foregoing embodiments of the invention, the case where the invention is applied to the internal combustion engine that is equipped with the VVT mechanism that changes the valve timing of the intake valve variable in addition to the variable working angle mechanism that change the working angle of the intake valve variable has been described. However, the invention is also applicable to an internal combustion engine that is not equipped with a VVT mechanism, as long as the internal combustion engine is equipped with a variable working angle mechanism.

What is claimed is:

1. A control apparatus for an internal combustion engine comprising:
    a variable working angle mechanism that changes a working angle of an intake valve; and
    a controller that, when the working angle is increased, corrects an opening degree of a valve for adjusting an intake air amount so as to increase the intake air amount,
    wherein the controller corrects the opening degree of the valve for adjusting intake air amount only when a speed of change in the working angle is higher than a prescribed speed,
    wherein the valve for adjusting the intake air amount is disposed at an upstream side of the intake valve.

2. The control apparatus for the internal combustion engine according to claim 1, wherein the controller, after the correction, gradually reduces an amount of the correction with passage of time.

3. A control apparatus for an internal combustion engine comprising:
    a variable working angle mechanism that changes a working angle of an intake valve; and
    a controller that,
    (i) when a cylinder filling air amount increases following a change in the working angle, corrects an opening degree of a valve for adjusting an intake air amount so as to decrease the cylinder filling air amount, and
    (ii) when the cylinder filling air amount decreases following the change in the working angle, corrects the opening degree of the valve for adjusting the intake air amount so as to increase the cylinder filling air amount,
    wherein the internal combustion engine is equipped with a hydraulic variable valve timing mechanism that hydraulically operates to change a valve timing of the intake valve, and the controller corrects the opening degree of the valve for adjusting the intake air amount when the working angle is increased in accordance with a deficiency in a working fluid pressure of the hydraulic variable valve timing mechanism,
    wherein the valve for adjusting the intake air amount is disposed at an upstream side of the intake valve.

4. A control apparatus for an internal combustion engine comprising:
    a variable working angle mechanism that changes a working angle of an intake valve; and
    a controller that,
    (i) when a cylinder filling air amount increases following a change in the working angle, corrects an opening degree of a valve for adjusting an intake air amount so as to decrease the cylinder filling air amount, and
    (ii) when the cylinder filling air amount decreases following the change in the working angle, corrects the opening degree of the valve for adjusting the intake air amount so as to increase the cylinder filling air amount,
    wherein the controller corrects the opening degree of the valve for adjusting the intake air amount only when a speed of change in the working angle is higher than a prescribed speed,
    wherein the valve for adjusting the intake air amount is disposed at an upstream side of the intake valve.

5. The control apparatus for the internal combustion engine according to claim 4, wherein the controller, after the correction, gradually reduces an amount of the correction with passage of time.

6. A control apparatus for an internal combustion engine comprising:
    a variable working angle mechanism that changes a working angle of an intake valve; and
    a controller that, when the working angle is increased, corrects an opening degree of a valve for adjusting an intake air amount so as to increase the intake air amount,
    wherein the internal combustion engine is equipped with a hydraulic variable valve timing mechanism that hydraulically operates to change a valve timing of the intake valve, and the controller corrects the opening degree of the valve for adjusting the intake air amount when the working angle is increased in accordance with a deficiency in a working fluid pressure of the hydraulic variable valve timing mechanism,
    wherein the valve for adjusting the intake air amount is disposed at an upstream side of the intake valve.

7. A control apparatus for an internal combustion engine comprising:
    a variable working angle mechanism that changes a working angle of an intake valve; and
    a controller that, when the working angle is increased, corrects an opening a degree of a valve for adjusting an intake air amount so as to increase the intake air amount,
    wherein the controller corrects the opening degree of the valve for adjusting the intake air amount when a valve-closing timing of the intake valve after the increase in the working angle is later than an intake bottom dead center,
    wherein the valve for adjusting the intake air amount is disposed at an upstream side of the intake valve.

8. A control apparatus for an internal combustion engine comprising:
    a variable working angle mechanism that changes a working angle of an intake valve; and a controller that, when the working angle is increased, corrects an opening degree of a valve for adjusting an intake air amount so as to increase the intake air amount, wherein the internal combustion engine is equipped with a variable valve timing mechanism that changes a valve timing of the intake valve, and the controller changes an amount of the correction and a timing of the correction in accordance with the valve timing of the intake valve set by the variable valve timing mechanism, wherein the valve for adjusting the intake air amount is disposed at an upstream side of the intake valve.

* * * * *